J. WINKELMEYER.
COMBINED MEAT SLICER AND CUTTER.
APPLICATION FILED OCT. 28, 1907.
908,826.
Patented Jan. 5, 1909.
5 SHEETS—SHEET 3.
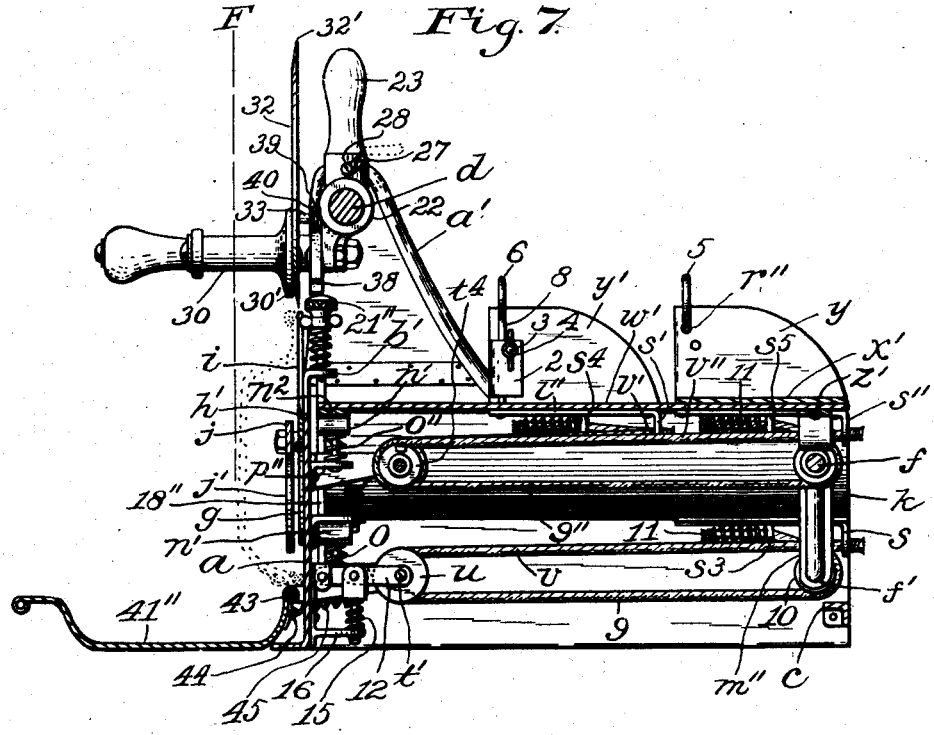
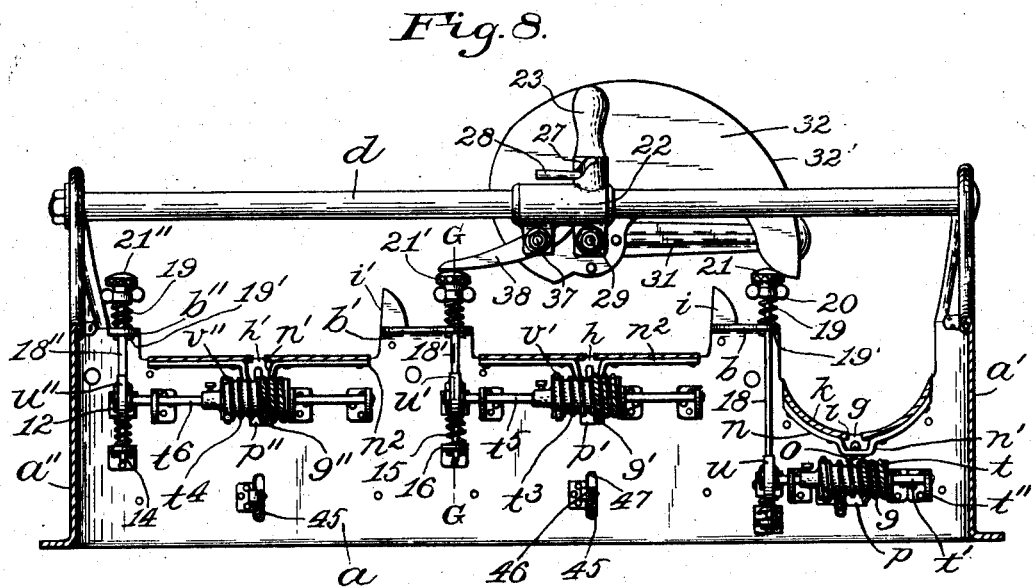
WITNESSES:
J. H. Gardner.
M. D. Beaty.
INVENTOR:
John Winkelmeyer,
BY
E. T. Silvius,
ATTORNEY.

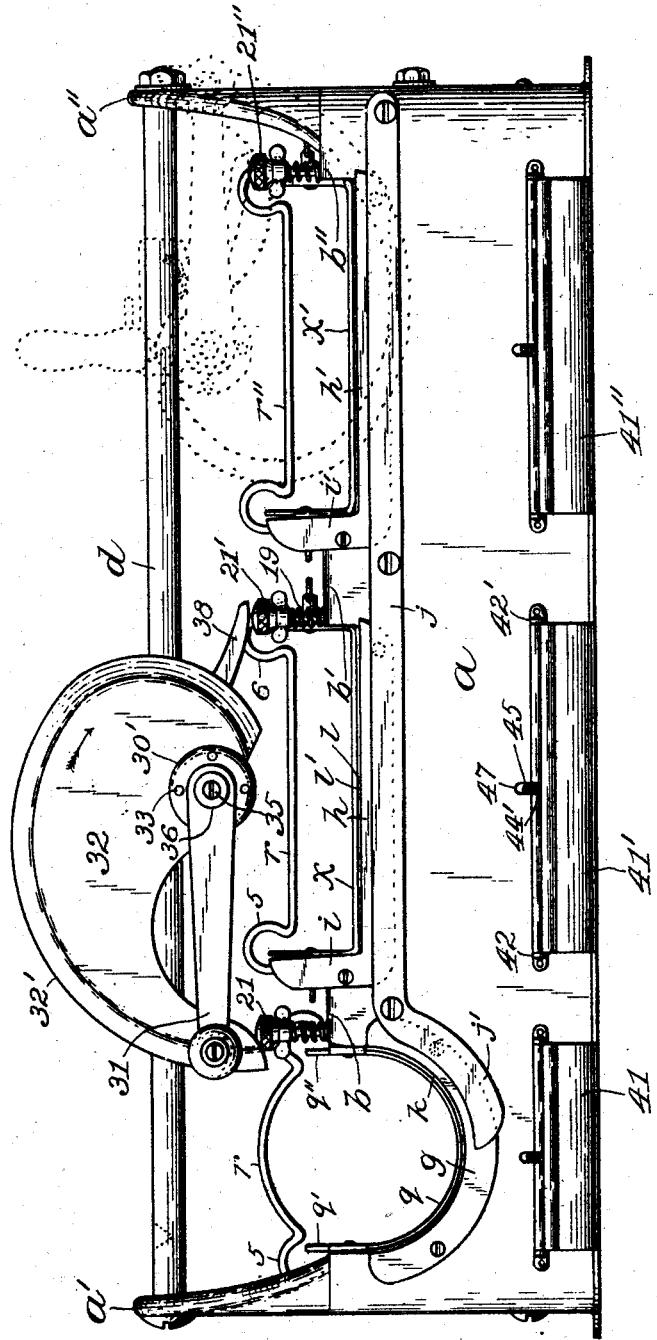

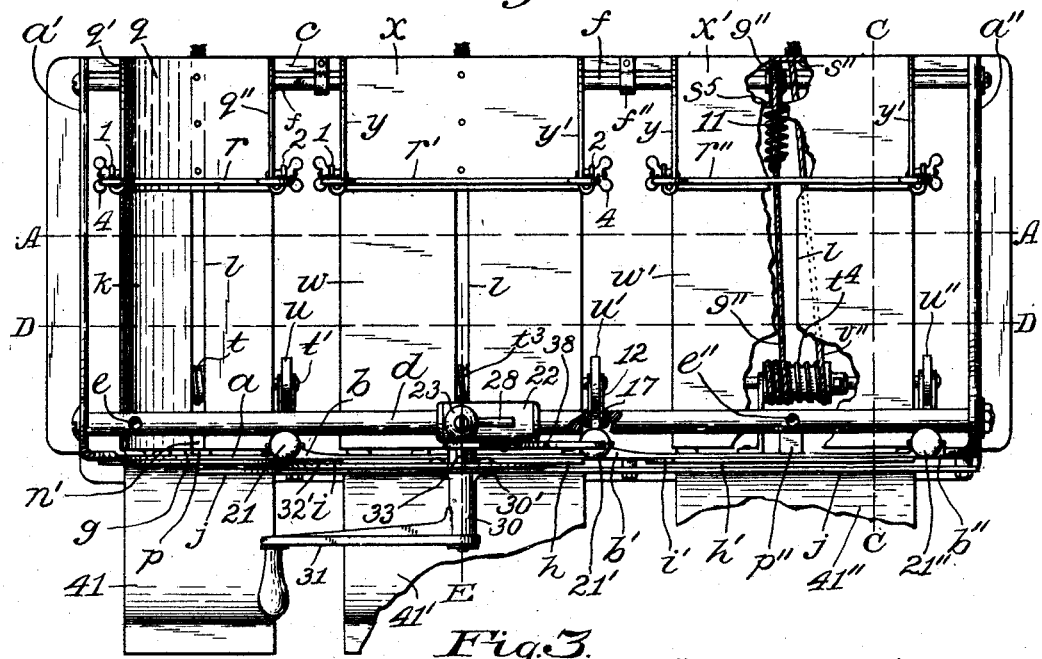
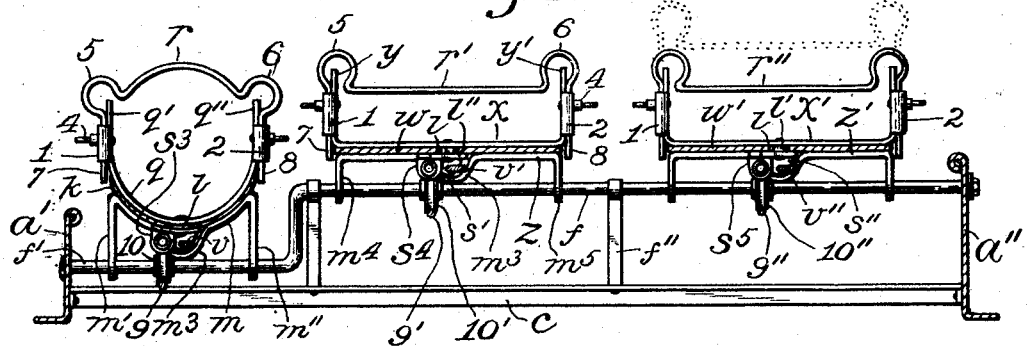
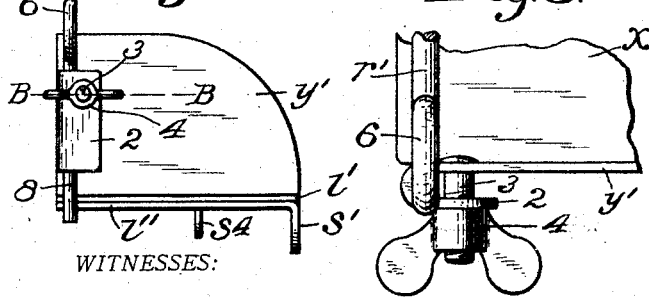
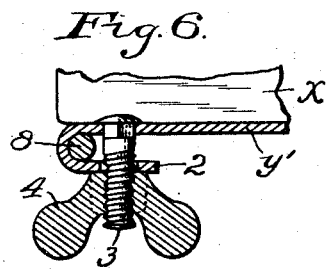

J. WINKELMEYER.
COMBINED MEAT SLICER AND CUTTER.
APPLICATION FILED OCT. 28, 1907.
908,826.
Patented Jan. 5, 1909.
5 SHEETS—SHEET 4.
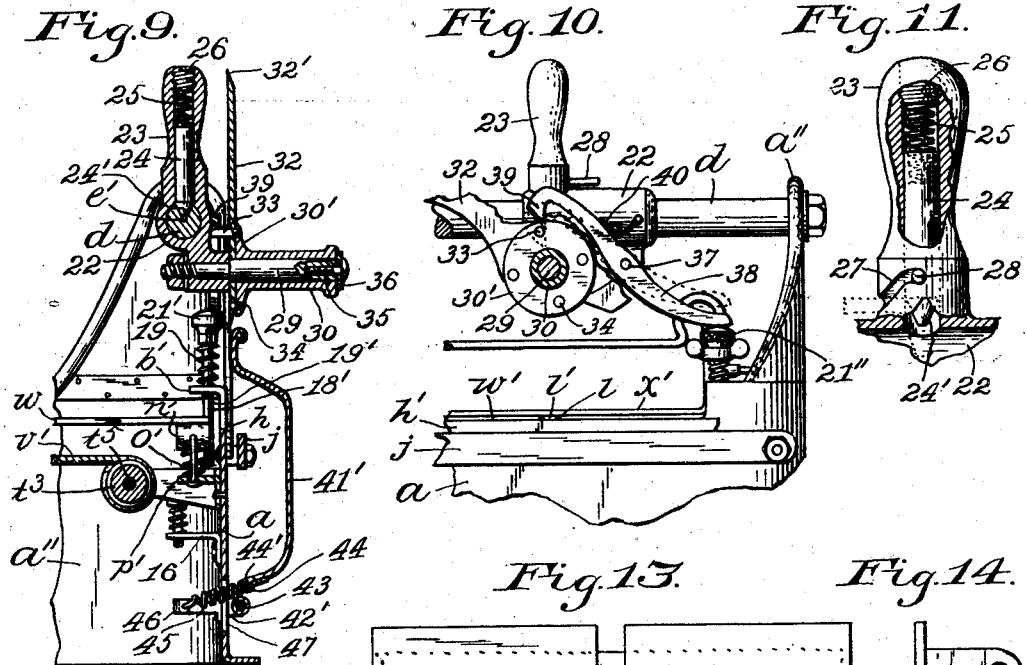
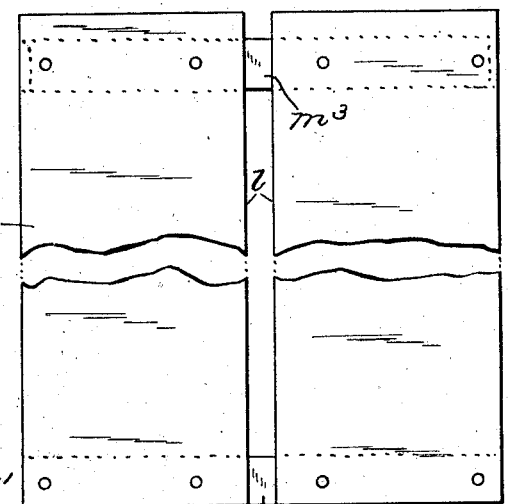
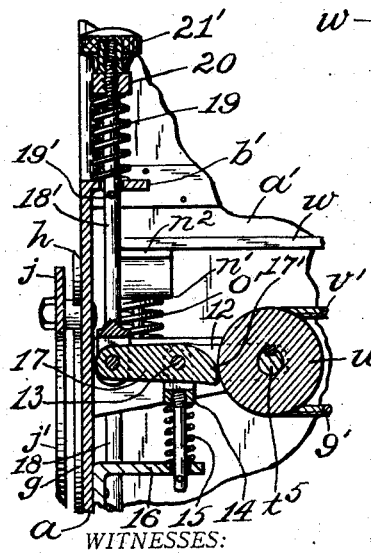
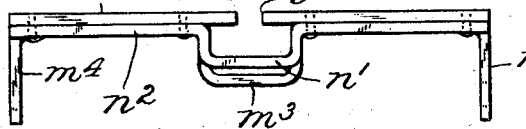
WITNESSES:
J. H. Gardner
M. D. Beaty
INVENTOR:
John Winkelmeyer,
BY
E. T. Silvius,
ATTORNEY.

J. WINKELMEYER.
COMBINED MEAT SLICER AND CUTTER.
APPLICATION FILED OCT. 28, 1907.
908,826.
Patented Jan. 5, 1909.
5 SHEETS—SHEET 5.
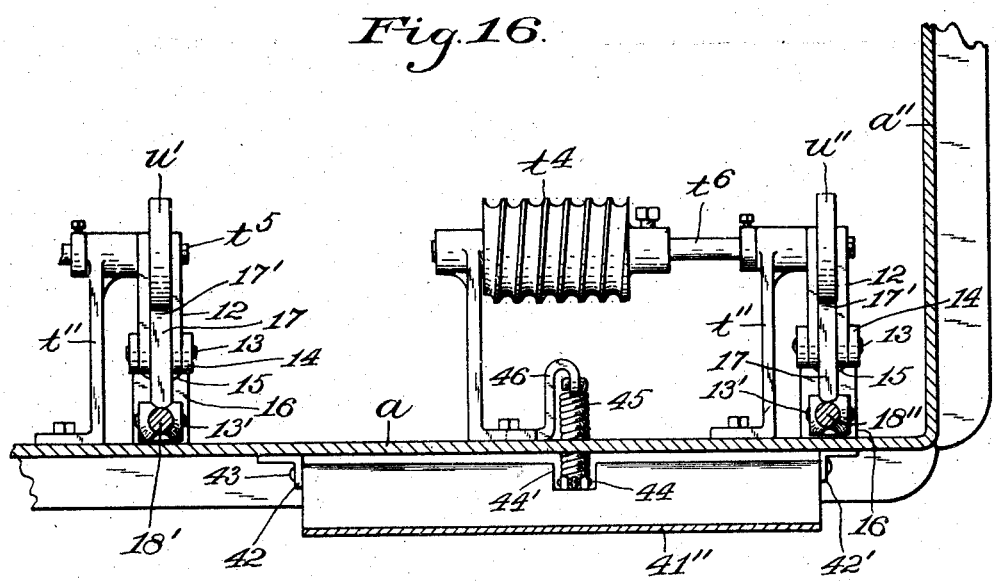
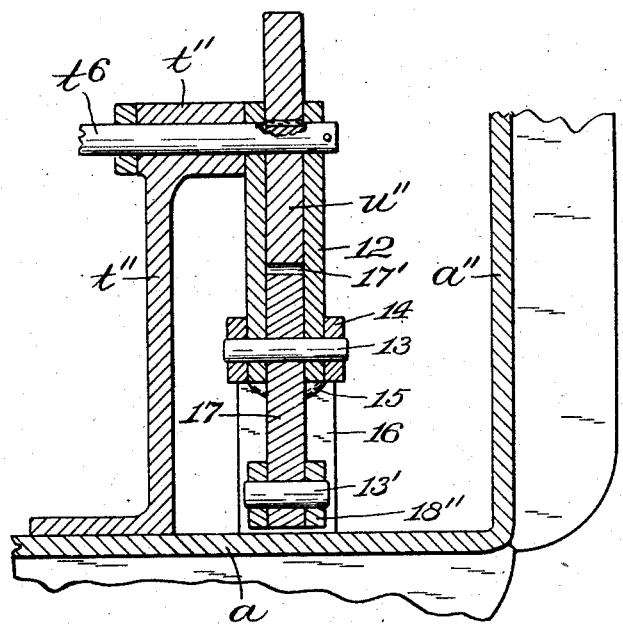
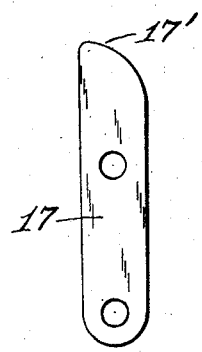
WITNESSES:
J. H. Gardner
M. D. Beaty
INVENTOR:
John Winkelmeyer,
BY E. F. Silvius,
ATTORNEY.

UNITED STATES PATENT OFFICE.

JOHN WINKELMEYER, OF ANDERSON, INDIANA, ASSIGNOR OF ONE-HALF TO THOMAS S. GETTLE, OF ANDERSON, INDIANA.

COMBINED MEAT SLICER AND CUTTER.

No. 908,826.   Specification of Letters Patent.   Patented Jan. 5, 1909.

Application filed October 28, 1907. Serial No. 399,575.

*To all whom it may concern:*

Be it known that I, JOHN WINKELMEYER, a citizen of the United States, residing at Anderson, in the county of Madison and State of Indiana, have invented certain new and useful Improvements in a Combined Meat Slicer and Cutter; and I do declare the following to be a full, clear, and exact description of the invention, reference being had to the accompanying drawings, and to the letters and figures of reference marked thereon, which form a part of this specification.

This invention relates to machines that are designed to be used by retail merchants for dividing or cutting meat into thin slices or into relatively larger pieces for retailing, the invention having reference particularly to a machine that is adapted to hold a number of kinds of meat from which it may be desired to cut slices or pieces of various thicknesses, the machine having a single cutting knife which is adjustable to different portions of the machine, so that relatively small pieces may be cut thereby from either one of the pieces of bulk meat.

The objects of the invention are to provide means in a single machine whereby a merchant may retail from a number of bulk pieces of meat expeditiously without requiring separate machines for the different kinds of meat, so that working space may be saved and loss of time avoided, a further object being to provide a machine for slicing meat uniformly and neatly, and which will be durable and economical in use while relatively inexpensive to produce.

The invention consists in a combined slicing and cutting machine comprising a plurality of meat holding and feeding apparatus and a cutting knife adapted to be moved into coöperation with either one of the holding and feeding apparatus, and the invention consists further in the novel elements of the machine and in the parts and combinations and arrangements of parts, as hereinafter particularly described and defined in the appended claims.

Referring to the drawings Figure 1 is a front elevation of the machine represented as being ready for use, the cutting knife being also represented in broken lines in its working position; Fig. 2, a top plan view of the machine with parts thereof broken away; Fig. 3, a vertical sectional view on the line A A in Fig. 2; Fig. 4, a side elevation of one of the feed heads for holding and feeding the meat to the cutter; Fig. 5, a fragmentary top plan of the feed-head; Fig. 6, a fragmentary horizontal sectional view on the line B B in Fig. 4; Fig. 7, a vertical sectional view on the line C C in Fig. 2; Fig. 8, a vertical sectional view on the line D D in Fig. 2, looking forward; Fig. 9, a fragmentary vertical sectional view on the line E in Fig. 2; Fig. 10, a fragmentary sectional elevation as on the line F in Fig. 7; Fig. 11, a fragmentary detail view showing parts of the cutting knife frame; Fig. 12, a fragmentary vertical sectional view approximately on the line G G in Fig. 8; Fig. 13, a top plan view of one of the guides and supports for the meat; Fig. 14, a side view of the guide and support; Fig. 15, a front end elevation of the guide and support; Fig. 16, a fragmentary horizontal sectional view showing portions of the feeding apparatus in plan; Fig. 17, a fragmentary horizontal sectional view of portions of the feeding apparatus; and, Fig. 18, a side view of the clutch lever of the feeding apparatus.

Similar reference characters throughout the different figures of the drawings designate corresponding elements or features of construction.

In a practical embodiment of the invention, provision may be made for cutting or slicing various articles of merchandise by modifying portions of the machine so as to accommodate peculiar shapes of the articles to be retailed, such as cheese or pressed meats. In the present case the machine is illustrated as having three divisions, one being suitable for slicing or cutting cylindrical forms of meat, such as boiled ham formed into cylinders, stuffed sausage or the like, and other divisions adapted to accommodate flat strips of meat or other articles such as dried beef or bacon, and the cutting knife is so mounted that it may be quickly moved to either one of the divisions or sections of the machine.

As preferably constructed the machine comprises a frame composed of sheet metal and bent to form a front *a*, and sides *a'* and *a''* suitably stiffened as by means of flanges at the bottom and beading at the top of the frame, portions of the top of the front *a* being turned over and formed as guides *b b' b''* for the feed rods. A rail *c* is attached at its ends to the sides *a'* and *a''* at the rear ends thereof, but may be omitted if desired. A strong guide bar $d$ extends from the top of the side $a'$ to the top of the side $a''$ and is suitably secured thereto for supporting the frame of a cutting knife adjustably, the guide bar being situated near the plane of the front $a$ and somewhat above the plane of the top thereof. The top of the guide bar has a suitable number of sockets therein as $e\ e'\ e''$. The rear portion of the frame comprises a rod $f$ that is attached to the side $a''$ and is bent downward and extends in a lower plane to the side $a'$ to which it is attached and forms a relatively low rod $f'$, the whole rod serving to pivotally support the meat guides at their rear ends and also to brace the sides $a'$ and $a''$ of the frame, and in some cases vertical braces $f''$ may be attached to the rod $f$ and the rail $c$ for stiffening those members. One portion of the front $a$ is cut away so as to have a concave top at the outer side of which a curved stationary knife $g$ is secured to the front of the frame. Other portions of the front $a$ are cut away so as to form broad openings in the top of the front at which horizontal stationary knives $h$ and $h'$ are secured and having vertical knives $i$ and $i'$ at ends thereof. A guide $j$ is mounted on the front $a$ and extends along the fronts of the knives $h$ and $h'$ and has a curved portion $j'$ extending partially along the front of the knife $g$, but spaced a suitable distance from the knives. The stationary knives extend upward slightly higher than the adjacent portions of the front $a$ and are beveled at their inner sides. The division or section for the cylindrical pressed meat has a trough-like guide $k$, having a guide slot $l$ extending longitudinally in the middle portion thereof. The rear end of the guide is provided with a frame member $m$ that is attached to the under side thereof which has two supporting arms $m'$ and $m''$ connected pivotally to the rod $f'$, the frame member $m$ having a loop $m^3$ extending under the guide slot $l$. The under side of the front end of the guide $k$ has a curved frame member $n$ attached thereto and it has a loop $n'$ below the guide slot $l$ that rests on a spring $o$ which is supported by a bracket $p$ secured to the inner side of the front $a$ of the frame. Other similar brackets $p'$ and $p''$ are mounted on the inner side of the front $a$ in higher planes for supporting springs $o'$ and $o''$ for the other meat guides and supports which are normally held slightly higher than the stationary cutting knives so that the meat may be moved freely above the knives without having contact therewith, the supporting springs permitting the supporting guides of the meat to yield while a cut is being made sufficiently to permit the meat to be pressed down onto the stationary knives.

A feed head $q$ is mounted slidingly in the trough-like guide $k$ and is also trough-like in shape and is suitably guided by means of the guide slot $l$, and it has upturned sides $q'$ and $q''$ on which a suitable clamp bar $r$ is mounted in any preferred manner, so as to clamp the meat to the feed head. The rear end of the feed head is provided with an ear $s$ that extends downward to serve in imparting movement thereto. A spirally grooved winding drum $t$ is secured to a shaft $t'$ that is mounted in suitable journal bearings $t''$ which are secured to the inner side of the front $a$ below the forward end of the guide $k$, and a friction wheel $u$ is secured also to the shaft $t'$. A cable $v$ is suitably secured to the winding drum and also to the ear $s$, so that when the winding drum is rotated periodically the feed-head $q$ will be moved forward toward the cutting knife. Other meat guides and supports $w$ and $w'$ are also provided rearward of the knives $h$ and $h'$ and are constructed identically alike, each having a longitudinal guide slot $l$ therein and are flat as tables on their tops on which are mounted feed-heads $x$ and $x'$, each having upturned sides $y$ and $y'$ to which are connected clamp bars $r'$ and $r''$ respectively, one feed-head having an ear $s'$ and the other one having an ear $s''$ to which cables $v'$ or $v''$ are connected, the cables being also connected to winding drums $t^3$ and $t^4$ respectively, that are secured to shafts $t^5$ and $t^6$ respectively, mounted also in bearings $t''$, these shafts having friction wheels $u'$ and $u''$ respectively secured thereto for the operation of the drums. The rear ends of the table-like guides and supports $w$ and $w'$ have frame members $z$ and $z'$ secured to the under sides thereof respectively, the members having each a loop $m^3$ under the guide slot $l$ and provided with arms $m^4$ and $m^5$ that are mounted pivotally on the rod $f$. The forward ends of the guides $w$ and $w'$ have each a frame member $n^2$ which is also provided with the loop $n'$ to engage the supporting springs $o'$ or $o''$. Preferably the feed-heads are guided by means of a guide-bar $l'$ that is secured to the under side of the feed-head so as to slide in the guide slot $l$ and a guide plate $l''$ secured to the guide bar $l'$ and extending under the plates of which the meat guides and supports are formed, and the ears as $s$ or $s'$ are preferably formed as parts of the plates $l''$.

As preferably constructed the clamp bars are attached to the sides of the feed-heads by means of clips 1 and 2 that are formed thereon and bolts 3 provided with thumb nuts 4, and the clamp bars have spring loops 5 and 6 from which extend arms 7 and 8 that are engaged by the clips, the body of the clamp bar being curved upwardly as an arch, and the bodies of the clamp bars $r'$ and $r''$ preferably being approximately straight, although the latter may be formed according to requirements to fit approximately upon various shapes of meat that are to be vended. When the nuts 4 are slackened, the clamp bars may be readjusted so as to secure the meat on the feed-heads and then fastened by the nuts.

The cables as $v$ may be made of any suitable material, but preferably are composed of cords so as to be cheap, but in any case in order to provide for accurate and uniform feeding, it is preferable to employ other cables as 9, 9′, 9″, either one of which is attached to a winding drum and is partially wound thereon so as to unwind when the feed cable is winding on the drum, these cables as 9 being extended about guide pulleys as 10 10′ 10″ on the rods $f$ and $f'$ and extending through ears as $s^3$ $s^4$ $s^5$, each of which is preferably formed as part of the guide plate $l''$, there being a spring 11 seated against the ear and the cable extending through the spring and attached to the farther end thereof so that the springs will keep the cables stretched at all times, or take up all slack if the cables are not at all elastic.

Each shaft as $t'$ $t^3$ $t^4$ has a double arm 12 mounted pivotally on the shaft, parts of the arm being at either side of the friction wheel as $u$ or $u'$ and has a pivot 13 connected thereto to which a guide 14 is connected on which is a spring 15 seated against a guide bracket 16 that is secured to the front $a$, the guide 14 extending through the guide bracket so that the arm 12 is supported yieldingly by the spring 15. A lever 17 is connected also to the pivot 13 and has an eccentric shaped clutch end 17′ adapted to engage the friction wheel on its periphery, the lever being connected by a pivot 13′ to a feed-rod as 18, 18′ or 18″, the feed rods extending respectively through the guides $b$, $b'$ and $b''$ and having each a spring 19 thereon seated on the top of the guide, and an adjusting nut 20 on the upper portion of the rod engaging the spring. The upper ends of the feed rods are provided with cap nuts as 21 21′ 21″ locking the adjusting nuts 20 and adapted to be engaged by a feed device for operating the winding drums and connected apparatus. The springs 19 hold the feed rods upwardly against suitable stops 19′, so that the clutches 17′ are close to or gently contacting with the adjacent friction wheel, and if pressure be put upon the cap nut the spring 19 will yield so that the lever 17 will tilt slightly and cause the clutch 17′ to engage the friction wheel and thereby cause it to rotate, the spring 15 permitting the necessary movement of the arm 12. When pressure is removed from the feed rod as 18, the spring 19 which is stronger than the spring 15 will retract the feed rod in advance of the upward movement of the guide 14 and arm 12, so that the clutch 17′ will move upwardly without having engagement with the friction wheel, or may drag in contact therewith without causing rotation of the friction wheel. The periodical movements of the friction wheels will of course move the feed-heads. The stops 19′ limit the upward movement of the feed rods, and the extent of the downward movement of the rods may be adjusted by means of the nuts 20 and 21 taken in connection with the device for operating the feed rods which has a fixed amount of movement, as will further appear.

A suitable knife frame 22 is mounted slidingly on the guide bar $d$ and has a hollow handle 23 on the top thereof in which is mounted a latch bolt 24 having a tapering end 24′ adapted to fit closely in the sockets as $e$ in the guide bar. A spring 25 engages the upper end of the latch bolt and is seated against a plug 26 that is inserted in the top of the handle for forcing the latch bolt into a socket. The handle has an inclined slot in the wall thereof through which extends a latch handle 28 with which the latch bolt 24 is provided, and by this means the latch bolt may be withdrawn and temporarily held from either socket. The knife frame is provided with a pivot 29 that extends forward over the front $a$ and rotatively supports a hub 30 having a flange 30′ and provided with a crank arm 31. A knife 32 has a beveled cutting edge 32′ and is semicircular or crescent-shaped and one end portion of the knife is secured to the flange 30′ by means of screws 33 and 34, one screw 33 extending beyond the inner side of the knife to serve as a finger for operating the feed mechanism. The hub 30 is retained on the pivot by a screw 35 and a washer 36. The cutting edge of the knife is eccentric to the pivot 29 around which the knife swings, so that when cutting the knife will begin cutting first at the portion thereof near the pivot and finish the cut with that portion of the cutting edge that is farther from the pivot whereby a shearing cut is obtained with the minimum effort, the beveled side of the knife being forward so that the straight side of the knife works against the straight side of either stationary knife as $h$, and is held thereto by the guide $j$. The knife frame is provided with a pivot 37 on which is mounted a tappet 38 that has a hook 39 on one end thereof adapted to be engaged by the finger or screw 33 when the knife is in motion to swing the tappet, the opposite end of the tappet extending above one of the cap screws as 21 of the feed rods for the operation thereof, and the finger may pass under the point of the hook so that the hook may drop into engagement with the finger and prevent the knife from rotating in the opposite direction. The tappet is preferably pressed by a spring 40 mounted on the frame 22.

A suitable number of pans as 41 41′ 41″ are mounted on the lower outer side of the front $a$ below the stationary cutting knives so as to receive the slices or pieces of meat that may be cut off, the pans being adapted to close up against the front *a* to serve as covers for the meat when the machine is not in use, each pan being supported by a pair of hinge members 42 and 42' that are secured to the front *a*, and hinge pins 43 connecting the pan to the hinge members. Each pan has a pivot 44 adjacent to a slot 44' that is cut in the hinged end of the pan, and one end of a coiled spring 45 is connected to the pivot 44 and also has its opposite end connected to an arm 46 that is attached to the inner side of the front *a*, the spring extending through a slot 47 in the frame front, so that when the pan is brought up against the front *a* it will be so held by the spring 45.

In practical use, one kind of meat or other article may be placed on the guide *k* and extend onto the feed-head *q* and be secured by the clamp bar *r*, and in a similar manner other different kinds of meat may be placed on the other guides *w* and *w'* and secured to the feed-heads. The whole machine of course may be suitably covered as is customary, or the different pieces of meat alone may be covered if desired. As occasion may require, the latch bolt handle 28 may be manipulated and the frame 22 moved so as to be above either one of the sections or divisions containing the meat which it may be desired to vend and secured in the desired position. If it is desired to cut thin slices, the cap nut adjacent to the tappet 38 will be adjusted so as to be spaced a considerable distance from the end of the tappet, so that the latter will travel through space the greater part of its stroke and then move the feed rod only a relatively short distance. If thicker slices are desired, the cap nut will be adjusted so as to be nearer to the end of the tappet, and may be readjusted so as to be close to the tappet when the latter is at rest. If it be desired to cut off a considerable quantity of meat at one cut, the feed-head may be pushed by hand the desired distance, and if found that the meat has been pushed forward too far, the feed-head may be retracted by hand, and it is to be so retracted after having cut up a piece of meat, preparatory to placing another bulk piece thereon. When the feed-heads are moved by hand, of course the winding drums will be rotated idly by the cables connected thereto and to the feed-heads.

Having thus described the invention, what is claimed as new is—

1. A slicer and cutter including a plurality of guides, a plurality of feed-heads mounted slidingly on the guides, one on each guide, independent feeding mechanism for each one of the plurality of feed-heads, a cutting knife movable to either one of the plurality of guides and past an end thereof, means for supporting the knife, and feeding devices actuated in correlation to the movements of the knife to connect with either one of the independent feeding mechanisms of the feed-heads.

2. A slicer and cutter including a plurality of guides, a plurality of feed-heads mounted slidingly on the guides, one on each guide, independent feeding mechanism for each feed-head and connected therewith, a plurality of stationary cutting knives each supported at an end of a guide, a movable cutting knife movable into contact with either one of the stationary knives, and a frame for supporting the movable cutting knife and carrying a feeding device to connect with either one of the independent feeding mechanisms of the feed-heads.

3. A slicer and cutter including a frame having a front, a plurality of feed-rods mounted on the front, a guide-bar secured to the frame, a plurality of guides mounted in the frame and having each a feed-head movable thereon, each feed-head having a feed-cable connected thereto, a plurality of winding drums mounted at the front of the frame, each drum having a cable connected thereto, operating means between each feed-rod and a winding drum for periodically actuating the drum, a knife frame mounted on the guide-bar and movable to the position of either one of the guides, a hub mounted rotatively on the knife frame and provided with a crank-arm, a cutting knife mounted on the hub, a feeding device mounted on the knife frame and carried thereby to either one of the feed-rods to contact therewith, and means for actuating the feeding device.

4. A slicer and cutter including a frame having a front, a plurality of guides mounted in the frame and extending rearward from the front, a plurality of feed-heads mounted slidingly on the guides and each having feeding mechanism connected thereto, one for each feed-head, a guide-bar secured to the frame, a knife-frame mounted on the guide-bar and movable thereon opposite to the front end of either guide, a cutting knife mounted movably on the knife frame, means for operating the knife and having feeding devices coöperating therewith to connect with either one of the feeding mechanisms of the feed-heads, and a plurality of pans hinged to the forward side of the front of the frame to swing up across the front ends of the guides or outward from the front of the frame.

5. A slicer and cutter including a frame, a plurality of guides mounted in the frame, one of the guides being trough-shaped and having a trough-shaped feed-head mounted slidingly thereon, the remaining guides being flat and having each a feed-head mounted slidingly thereon, each feed-head having separate feeding mechanism connected thereto, a plurality of feed-connections mounted on the front of the frame to operate the feeding mechanisms separately, one for each mechanism, a guide-bar secured to the frame, a knife-frame mounted on the guide-bar and movable to positions opposite to either one of the guides, a cutting knife mounted movably on the knife-frame, a feeding device mounted on the knife frame and movable thereby to either one of the feeding connections to contact therewith, and means between the knife and the feeding device for actuating the feeding device automatically.

6. A slicer and cutter including a frame having a front and provided near the front with a guide-bar, a plurality of guides pivoted at ends thereof to the rear end of the frame, a plurality of springs supported by the front of the frame and yieldingly supporting the forward ends of the guides, a plurality of stationary cutting knives secured to the front of the frame adjacent to the forward ends of the guides, a plurality of feed-heads mounted movably on the guides, one for each guide, a knife-frame mounted on the guide-bar and movable thereon to the position opposite to either one of the stationary knives, means for latching the knife-frame to the guide-bar, and a cutting knife mounted pivotally on the knife frame and provided with an operating crank arm.

7. A slicer and cutter including a main frame having a front, a plurality of knives mounted fixedly on the front of the frame, a plurality of guides extending from the front rearward and having their rear ends supported pivotally by the main frame, springs mounted on the front of the main frame and yieldingly supporting the forward ends of the guides, a plurality of feed-heads mounted movably on the guides, one for each guide and provided each with independent feeding mechanism connected thereto, a guide-bar mounted on the main frame at the front thereof, a knife-frame mounted on the guide-bar and movable thereon to the position opposite to either one of the fixedly-mounted knives, a curved cutting knife mounted pivotally on the knife frame to coöperate with either one of the fixedly-mounted knives, means for operating the cutting knife, and feeding devices actuated in correlation to the movements of the cutting knife to connect with either one of the independent feeding mechanisms of the feed-heads.

8. In a meat slicer and cutter, the combination of a main frame formed of sheet metal and having a front and two sides, a pivot-rod supported by the rear ends of the two sides, a stationary horizontal knife attached to the front of the frame and having an upright portion, a spring supported by the front of the frame, a combined meat support and guide having one end thereof supported by the pivot-rod and its opposite end supported yieldingly on the spring, a feed-head mounted movably on the combined meat support and guide, a knife-frame mounted on the main frame, and a cutting knife mounted on the knife-frame and movable into contact with the stationary knife.

9. In a meat slicer and cutter, the combination of a main frame having a front, a combined meat support and guide mounted in the frame, a feed-head mounted movably on the support and guide, a clamp bar mounted on the feed-head, a stationary knife at the front end of the support and guide, a knife-frame supported at the front of the main frame, a rotative shaft mounted at the rear of the front of the main frame and having operative connection with the feed-head, a clutch-wheel secured to the shaft, an arm pivoted to the shaft, a spring supporting the free end of the arm yieldingly, a lever pivotally mounted on the arm and having a clutch-end to engage the clutch-wheel, a feed-rod connected to the lever, a cutting knife mounted pivotally on the knife-frame, and a feeding device actuated in correlation to the movements of the cutting knife to connect with the feed-rod.

10. In a meat slicer and cutter, the combination of a frame having a front, a combined meat support and guide mounted in the frame and having a feed-head mounted movably thereon that is provided with two ears, a guide-pulley mounted in the rear portion of the frame, a winding drum mounted on the front of the frame, a feed-cable connected to the winding-drum and also to one of the ears of the feed-head, a return-cable connected also to the winding-drum and extending about the guide pulley and through the other one of the ears of the feed-head and having a spring connected thereto that is seated against the ear, means for actuating the winding drum, and a cutting knife mounted on the frame and movable past the end of the combined meat support and guide opposite to the feed-head.

11. In a meat slicer and cutter, the combination of a frame having a front, a winding-drum mounted on the front of the frame and provided with a friction-wheel, a lever mounted on a movable pivot and having a clutch-end for engaging the friction-wheel when moved in one direction, a spring yieldingly supporting the pivoted lever, a feed-rod connected to the lever, a combined meat support and guide mounted in the frame, a feed-head mounted on the said guide, a cable connected to the winding drum and also to the feed-head, a tappet mounted opposite to the feed-rod, a cutting knife mounted on the frame and movable past the end of the said guide opposite to the feed-head, means between the knife and the tappet for periodically actuating the tappet, and means for holding the knife in a normal position at rest.

12. In a meat slicer and cutter, the combination of a frame having a front, a guide-bar secured to the frame near the front thereof and having recesses therein, a plurality of combined meat supports and guides mounted on the frame and extending from the front thereof, a knife-frame mounted adjustably on the guide-bar and having a hollow handle, a latch bolt mounted in the handle to enter either one of the recesses of the guide-bar, and a cutting knife mounted pivotally on the knife-frame to swing past the forward end of a combined meat support and guide.

In testimony whereof, I affix my signature in presence of two witnesses, on the 23rd day of October, 1907.

JOHN WINKELMEYER.

Witnesses:
  DANIEL L. BOLAND,
  JOSEPH P. BEHMIAN.